# 3,095,428
N,N-DISUBSTITUTED ARYLAMIDES
John O. Van Hook, Abington, Pa., assignor to Rohm & Haas Company, Philadelphia, Pa., a corporation of Delaware
No Drawing. Filed Apr. 7, 1959, Ser. No. 804,592
8 Claims. (Cl. 260—348)

This invention relates to new and useful N-arylamides and to resinous compositions plasticized therewith.

More especially, this invention concerns new N,N-disubstituted arylamides which by virtue of their unique structure are useful plasticizers for polyvinyl halide resins. The plasticized resins are valuable in numerous applications. The new arylamides of the invention are disubstituted on the nitrogen atom, and optionally on the aryl radical, by olefinically unsaturated aliphatic groups and/or by saturated aliphatic groups.

In one embodiment of the invention, the N-arylamides are substituted on the nitrogen atom with alkyl and/or alkenyl groups. In another aspect, the alkyl substituents are bonded together, forming an alkylene group which, together with the nitrogen atom and the carboxyl group, forms a lactam grouping. A special embodiment of the invention provides for N-arylamides in which all or part of the olefinic unsaturation in the aliphatic substituent groups is taken up by select functional groups, the epoxide group being an especially favored one.

Resinous materials, such as vinyl polymers, generally form brittle products; and it is necessary to add a plasticizing agent thereto. Materials that have been used for this purpose include dioctyl phthalate, dibutyl phthalate, and tricresyl phosphate. While these materials give improved flexibility, they possess definite defects which have placed a considerable limitation on their general all-round application and their use in specialized applications. Many of these plasticizing agents, for example, are quite volatile and are readily lost from the plasticized composition through evaporation; others are lost through migration because they fail to retain their initial compatibility. In addition, these plasticizing agents endow the thermoplastic resinous compositions with flexibility at normal temperatures; but at low temperatures, the compositions again become brittle and are easily cracked. Furthermore, compositions containing the conventional plasticizing agents have poor thermal stability; i.e., when they are exposed to high temperatures, they lose their strength and are discolored. When employed as plasticizers, the N-arylamides of the invention offer a desirable and useful combination of properties which help in overcoming the inadequacies of the more conventional plasticizers; also, the N-arylamides of the invention have other desirable properties discussed further below.

The N,N-substituted arylamides of this invention may be defined by the following formula

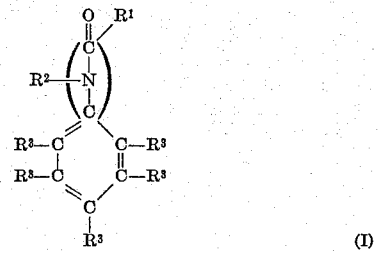

(I)

where $R^1$ and $R^2$, when taken singly, represent aliphatic hydrocarbon groups free of acetylenic unsaturation; when taken together, $R^1$ and $R^2$ represent an alkylene chain, preferably containing 3 to 5 carbon atoms in the chain, which, together with the nitrogen atom and the carbon atom onto which they are respectively bonded, form a lactam grouping, containing 4 to 6 carbon atoms as part of the heterocyclic ring; and $R^3$ represents a hydrogen atom or an aliphatic hydrocarbon group free of acetylenic unsaturation. When considered singly, $R^1$ and $R^2$ may be the same or they may be different; $R^3$ may be the same as or different from $R^1$ and/or $R^2$.

The N-arylamides of the invention preferably contain at least a total of 24 carbon atoms. The upper limit of the $R^1$, $R^2$, and $R^3$ substituents, when they are considered individually, as well as the upper limit for the total carbon content of these compounds, varies over a range which depends principally upon the individual compounds and the particular application intended therefor. For practical reasons, it does not appear now necessary to exceed a total carbon atom content of 72. When the compounds of this invention are employed as plasticizers for polyvinyl halide resins and when the $R^1$, $R^2$, and $R^3$ are alkyl or alkenyl groups, the upper limit for the total carbon content preferably does not exceed 39 and more specially does not exceed 29 carbon atoms. When one or more of the $R^1$, $R^2$, or $R^3$ groups are substituted or contain select functional groups, such as epoxides, greater latitude with respect to total molecular weight is allowable, a carbon content ranging upward of 39 into the range of 52 to 72 being acceptable. For best results as plasticizers, the N-arylamides of the invention should be liquids at about 25° C. Of special interest are the N-arylamides which are liquids and which have a boiling point above about 180° C. at 1 mm. Hg pressure. Preferably, the arylamides have a viscosity of below Z on the Gardner-Holdt scale.

One valuable embodiment of the invention provides a first group of arylamides which comply with Formula (I) and in which $R^1$ and $R^2$ are alkyl radicals, while $R^3$ represents hydrogen atoms. The alkyl groups each contain at least 1 carbon atom, the preferred upper limit being 22 carbon atoms. The total minimum carbon content of the alkyl substituted N-arylamides does not exceed 24, with the proviso that when $R^2$ is methyl and $R^1$ is an alkyl group while $R^3$ is a hydrogen atom, the minimum total carbon atom content is 26. The preferred maximum for the total carbon content is 39. The alkyl groups may be the same or different; they may be straight or branched; they may be a cycloalkyl group. In the situation where $R^1$ and $R^2$ are bonded to each other, they form an alkylene chain of 3 to 5 carbon atoms, which together with the nitrogen atom and the carbon atom of the carboxyl group, form a lactam heterocyclic ring. This ring contains 4 to 6 carbon atoms. Typical are γ-lactam, δ-lactam, and ε-lactam. There may be substituted various radicals, as alkenyl and alkyl radicals of the type defined above. They may be substituted with one or more lower alkyl groups.

A second group of useful amides provided by the invention are those in which at least one of the radicals $R^1$, $R^2$, and $R^3$ is an alkenyl radical. The alkenyl radical contains from 1 to preferably not over 22 carbon atoms, generally from 12 to 22 carbon atoms; the total carbon atom content of these alkenyl-substituted arylamides ranges from 24 to preferably not over 39. When the alkyl and/or alkenyl-substituted N-arylamides are used as primary plasticizers for polyvinyl halide resins, it is preferable that the total carbon content does not exceed 29.

In accordance with this invention, each $R^1$, $R^2$, and $R^3$ substituent, and especially the $R^1$ and $R^2$ substituent, may be a mixture of alkyl and alkenyl radicals to provide N-arylamide mixtures wherein individual molecules are alkyl-substituted while others are alkenyl-substituted, whereas still others are substituted with both these groups. Such mixtures of N-arylamides are derived, for instance, from mixtures of highly branched alkenes, obtainable from the cracking of petroleum, and from mixtures of saturated and olefinically unsaturated fatty alcohols and acids. Suitable mixed acids may be obtained by saponification of natural glycerides, acidification of the resulting salts, and fractionation. Such oils include cottonseed oil, peanut oil, tall oil, neat's-foot oil, olive oil, palm oil, sunflowerseed oil, corn oil, sesame oil, soybean oil, safflower oil, menhaden oil, lard, and the like, vegetable and animal oils, fats, or foots, and the products of partially or fully hydrogenating oils, fats, and foots. Suitable sources for such glyceridic oils and their description are illustrated by United States Patent No. 2,810,733, describing the proportion of saturated and unsaturated fatty acids in numerous vegetable oils. When the N-arylamides of the invention are employed as plasticizers, it is preferred that the number of olefinic bonds does not exceed an average of two bonds per $R^1$, $R^2$, and $R^3$ substituent. Reduction of the proportion of olefinic unsaturation is obtainable by hydrogenation of the double bonds by suitable procedures, such as illustrated in United States Patent No. 2,822,368, or by epoxidation of the olefinic unsaturation to give epoxy N-phenylamides. Introduction of olefinic unsaturation is obtainable by catalytic dehydration.

The N,N-di-substituted arylamides of the invention which possess olefinic unsaturation in at least one of the substituents have the additional value of being suitable starting materials for the preparation of another new and valuable class of N,N-di-substituted arylamides in which part or all of the olefinic unsaturation has been replaced by a select variety of functional groups which impart further beneficial properties to these arylamides.

Typical members of this new class of arylamides having select functional groups are illustrated further below in Table A. Within this group, the epoxy phenylamides are a class coming under very special consideration, because they possess unique beneficial properties as plasticizers. The epoxy-N-phenylamides conform to Formula (I) with the additional characteristic of possessing at least one epoxy group as part of the $R^1$, $R^2$ and/or $R^3$ substituents. While all three substituents may be fully or partially epoxidized, very valuable results are obtained when one or two, like $R^1$ and/or $R^2$, of the three substituents are partially or fully epoxidized. A valuable group of epoxy amides are those in which $R^1$ and $R^2$ are derived from mixtures of saturated and olefinically unsaturated fatty acids, such as those of a content of 12 to 22 carbon atoms, in which the original olefinic unsaturation is epoxidized to an extent of at least 70%, especially 80%, of the theoretical oxirane-oxygen. In this connection, it should be noted that generally epoxidation procedures introduce into the olefinic bond along with the epoxide groups some minor amounts of other groups, like hydroxyl groups and groups derived from the epoxidizing peracid, such as formoxy and acetoxy and the like. Generally, these groups will not be present in excess of about 15% to 20% of the total amount of epoxide introduced in the molecule. These groups may be further modified, for instance, by acylation. Apart from the epoxides and the above-mentioned by-product groups, there may be present in the molecule residual olefinic unsaturation. Optionally, these olefinic groups may be saturated, as with hydrogen, or with other groups, or they may be left unsaturated.

The epoxy N-arylamides of the invention have an additional advantage when they are employed as plasticizers for polyvinyl resins. To a remarkable extent, they promote compatibility and stability with the resin, notwithstanding the greater total molecular weights of the compounds. Hence, the epoxy N-arylamides of the invention may have a maximum total carbon content ranging from about 39, with the concurrent presence of one epoxy group in the molecule, to about 78 with the concurrent presence of about 4 epoxy groups in the molecule.

Intermediate total carbon content is obtainable with intermediate epoxide content, each epoxide group corresponding to about a maximum increase of about 12 carbon atoms to the total carbon content of the N-arylamide. Epoxide contents exceeding 4 admit correspondingly greater carbon content in the molecule. Likewise, it will be appreciated that in mixed N-arylamides, such as those derived from mixtures of saturated and unsaturated fatty acids, the epoxide content commonly is a fractional number like 1.5, 2.5 and the like. In view of these various advantages discussed above, the epoxy N-arylamides of this invention form a valuable group of plasticizers, as will be shown hereinafter.

Illustrative of the new arylamides provided by the invention, there may be named the following:

N-methyl-N-phenyl-3-octyltridecanamide
N-methyl-N-phenyl-2-octyldodecanamide
N-decyl-N-o-toluylisotridecanamide
N-ethyl-N-phenylisoeicosamide
N-linolenyl-N-phenyllauramide
N-oleyl-N-phenylacetamide
N-oleyl-N-phenylbutyramide
N-arachyl-N-phenylisovaleramide
N-butyl-N-phenylpalmitoleamide
N-ethyl-N-phenyloleamide
N-octyl-N-phenyl-10-undecenamide
N-decyl-N-phenyloleamide
N-decyl-N-phenyllinoleamide
N-octadecenyl-N-m-toluyllinoleamide
N-undecenyl-N-phenyl-decanamide
N-tetradecyl-N-phenyl-3-hexenamide
N-decyl-N-phenyllinolenamide
N-tetradecyl-N-phenyloleamide
N-tetradecyl-N-phenyllinoleamide
N-linolenyl-N-(eicosylphenyl)linoleamide
N-decyl-N-toluyloleamide
N-isodecyl-N-phenyloleamide
N-decyl-N-phenyllinolenamide
N-butyl-N-dodecylphenylbutyramide
N-isodecyl-N-octylphenylcaprilamide
N-ethyl-N-phenyl-9,10-epoxystearamide
N-ethyl-N-phenyl-9,10-epoxypalmitamide
N-tetradecyl-N-phenyl-9,10-epoxystearamide
N-tetradecyl-N-toluyl-9,10-epoxystearamide
N-tetradecyl-N-phenyl-9,10,12,13-diepoxystearamide
N-decyl-N-phenyl-9,10-epoxystearamide
N-decyl-N-phenyl-9,10,12,13-diepoxystearamide
N-decyl-N-phenyl-9,10,12,13,15,16-triepoxystearamide
N-(9,10-epoxystearyl)-N-phenylbutyramide
N-(9,10,12,13-diepoxystearyl)-N-butylphenylpalmitamide
N-(9,10-epoxystearyl)-N-phenyllauramide
N-(9,10-epoxybehenyl)-N-phenylcapramide
N-(9,10,12,13-diepoxystearyl)-N-phenyltetracosnamide
N-tetradecyl-N-phenylamide of epoxidized tall oil fatty acids
N-isodecyl-N-phenylamide of epoxidized soybean oil fatty acids
N-isohexyl-N-phenyl-9,10-epoxystearamide The term "iso" refers to highly branched alkyl radicals.

Other than the epoxy groups, as illustrated above, there are a number of select functional groups which were found to further enhance the value of the N-arylamides. In Table A, there are listed typical substituted N-arylamides and the corresponding class which each one illustrates. A separate column provides the optimum range of total carbon atoms in the compounds for each class when the illustrated member of the class possesses one of such functional groups in the molecule.

By increasing the number of functional groups in the molecule, N-phenylamides of correspondingly greater total carbon content may be employed as plasticizers for polyvinyl halide resins without sacrificing compatibility.

TABLE A

Functionally Substituted N-Arylamides

| Total Carbon Atom Content | Class | Compound |
|---|---|---|
| 23-33 | Halides | N - phenyl - N - isobutyl - 12 - bromostearamide. |
| 24-42 | Ketones and aldehydes | N - phenyl - N - isodecyl - 12 - ketostearamide. |
| 20-52 | Carbonates | N - phenyl - N - tetradecyl - 9,10-carbonatostearamide |
| 22-52 | Anhydrides | 1 - octyl - N - phenyl - N - decyl carbamoyloctylsuccinic anhydride. |
| 22-52 | Acetals | 5 - octyl - 4 - (N - methyl - N - phenyl) carbamylheptyl dioxalane. |
| 23-54 | Lactones | 4 - methyl - 4 - (N - phenyl - N - tetradecylcarbamoylethyl)-bytyrolactone. |
| 21-38 | Esters | N - (2 - ethylhexanoxybutyl) - N-phenyl-2-ethylhexanamide. |
| 22-47 | Urethanes | 3 - phenyl - 4 - octyl - 5 - (N - phenyl - N - decylcarbamyl - heptyl)-2-oxazolidone. |
| 22-54 | Sulfoxides | N-phenyl-N-decyl-10-methyl-sulfinylstearamide. |
| 22-54 | Sulfones | N-phenyl-N-decyl-10-methyl-sulfonylstearamide. |
| 20-52 | Sulfonic esters | N - decanoyl - N - phenylamino-butyl tosylate. |
| 20-56 | Sulfamides | N - phenyl - N - (N' - decanoyl - N'-phenylaminobutyl)toluene-sulfonamide. |
| 20-56 | Phosphonic Esters | N-phenyl-N-decyl-9,10-methyl-phosphonatostearamide. |
| 20-56 | Phosphate Esters | N-phenyl-N-decyl-9,10-methyl-phosphatostearamide. |

In connection with this class of N-arylamides substituted with select functional groups, it should be noted that they need not be derived from the corresponding unsaturated N-arylamides. Those skilled in the art will appreciate that by judicious selection of the method of synthesis, the selected functional group may already be present when the final N,N-di-substituted arylamide is synthesized. For example, one skilled in the art may initiate the synthesis from fatty acids substituted with mercapto, sulfido, nitrilo, carbonato, acyl, and other such suitable groups. Subsequently, he may proceed along suitable routes for completing the synthesis of the desired N,N-di-substituted arylamides.

The N,N-substituted arylamides of the invention may be obtained in a variety of ways; they may be prepared by an acidolysis of suitable amides, or the alkylation of monosubstituted amides. Alternatively, a convenient method for their preparation is in accordance with the following general scheme in which $R^1$, $R^2$ and $R^3$ are aliphatic hydrocarbon radicals free of acetylenic unsaturation.

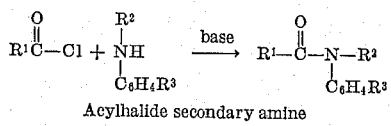

Acylhalide secondary amine

Instead of an acyl halide, the selected secondary amide may be acylated with a carboxylic acid, a carboxylic anhydride, or a suitable ester.

If it is desired to proceed by an acidolysis of a suitable amide, the procedure described by Roe, Scanlon and Swern, J. Am. Chem. Soc., 71, 2217 (1949) may be followed in a general way. For alkylating amides, there may be adapted general alkylations of amides, as those described by Thielepape in Ber. 78, 752 (1935) or by H. Arnold in Arch. Pharm. 279, 181–186 (1941).

A convenient preparative method is to treat an acyl halide with a secondary amine. The reaction may be carried out by admixing the acyl halide with the amine, the latter being optionally dissolved or suspended in a solvent, such as an aliphatic or aromatic hydrocarbon, and the like. The hydrohalic acid formed is generally taken up by an excess of secondary amine, a tertiary amine, as pyridine, or an inorganic base, such as sodium hydroxide.

Separation of the resulting amide may be carried out with suitable organic solvents.

The N,N-di-substituted epoxy-N-arylamides of the invention are best prepared by subjecting the unsaturated N-arylamide to an epoxidizing peracid, which may be preformed in a preliminary operation or which may be formed in situ, using hydrogen peroxide. Catalysts may be employed to promote the reaction which is normally carried out at a temperature of 10° to 80° C. Optionally, a solvent may be employed. For epoxidation procedures suitable for the preparation of the present epoxy N-arylamides, reference is made to the art, such as to U.S. Patents 2,458,484; 2,485,160; 2,692,271; 2,756,242; 2,836,605; and Swern, Chem. Reviews 45, 3–9 (1949).

The following examples are illustrative of methods for preparing typical N-arylamides of the invention. They are not to be construed as limiting the invention in spirit or in scope. It will be apparent to those skilled in the art that many modifications in materials and methods can be made without departing from the invention. In these examples, relative amounts of materials are indicated in parts by weight.

EXAMPLE 1

*N-Phenyl-N-Isodecyloleamide*

A solution of 177 parts of N-isodecylaniline and 47.4 parts of pyridine and 300 parts of chloroform is stirred and maintained at a temperature range of about 5° to 10° C. while 150 parts of oleoyl chloride is added. The mixture is allowed to warm to 25° C. while stirring and maintained at 25° to 30° C. for 16 hours. It is then refluxed for two hours, cooled, washed with a solution of 30 parts of acetic acid and 200 parts of water and distilled. After removal of solvents, there is obtained 5 parts of product which boils at 220° to 245° C. at 0.3 mm. pressure. The major portion of the product is collected as a residue weighing 230 parts. The analysis of the combined products confirms its identity as N-phenyl-N-isodecyloleamide. Iodine number: found 49; theory 51.

In a similar manner, N-ethyl-N-phenyloleamide, N-octadecenyl-N-m-toluyllinoleamide, and N-tetradecyl-N-phenyllinoleamide are prepared following the same procedure.

EXAMPLE 2

*N-Methyl-N-Phenyl-3-Octyltridecanoamide*

A solution of 59 parts of N-methylaniline in 300 parts of anhydrous ether is stirred and maintained at 0° to 10° C. with external cooling while 76 parts of 3-octyl-tridecanoyl chloride is added. The mixture is then stirred at 25° C. for 5 hours and at 38° C. for 1½ hours, after which it was washed three times with water. The organic material is dried over calcium sulfate and distilled to give after removal of ether and excess N-methylaniline, 70 parts of product boiling at 220° to 223° C. Analysis confirms the identity of the product as N-phenyl-3-octyl-tridecanoamide. Analysis shows $n_D{}^{25}$, 1.4809, nitrogen content 3.30% (theory 3.37%).

Also, N-methyl-N-phenyl-2-octyldodecanamide, N-decyl-N-o-toluyl isotridecanamide, and N-ethyl-N-phenyl-isoeicosamide are obtained in like manner in good yield.

EXAMPLE 3

*N-Dodecylphenyl-N-Butylbutyramide* p-Alkylaniline with $C_{12}H_{25}$ substituents which are branched isomers is alkylated using butyl bromide. The alkylaniline, 483 parts, is stirred and heated to 90° C. at which time 137 parts of butyl bromide are added while maintaining the temperature at 90° to 100° C. At the end of the addition, the mixture is heated at from 100° to 120° C. for 6 hours and then cooled. Sixty parts of sodium hydroxide and 240 parts of water are added, the mixtures are stirred 15 minutes and then separated. Distillation of the organic layer gives, after removal of excess alkylaniline, N-butyl-N-dodecylphenylamine. This amine (317 parts) is dissolved in 1000 parts of chloroform, 87 parts of pyridine are added, and then 107 parts of butyryl chloride are added over a period of one hour while the temperature is maintained at 15° to 30° C. with cooling. The mixture is then heated at reflux for three hours, cooled and washed three times with water. Distillation of the organic layer gives the product which boils at 200° to 240° C. at 0.3 to 1 mm. pressure. Analysis confirms that the product is N-dodecylphenyl-N-butylbutyramide.

Likewise, there are obtained N-linolenyl-N-(eicosylphenyl)linoleamide and N-isodecyl-N-octylphenylcaprilamide following the procedure detailed above.

EXAMPLE 4

N-Phenyl-N-Isodecyl-9,10-Epoxystearamide

A solution of 199 parts of N-phenyl-N-isodecyloleamide in 300 cc. benzene is stirred and maintained at 18° to 20° C. with gentle cooling. A solution of 117 parts of a 40% solution of peracetic acid in acetic acid containing 6 parts of sodium acetate is added during one hour. The mixture is stirred at 18° to 25° C. for 16 hours, washed with water twice, once with sodium hydrogen carbonate solution and once with water and distilled to a pot temperature of 125° C. to remove solvent, the last traces of which were removed by reducing the pressure to 1 mm. pressure. There are collected 203 parts (99% yield) of product. Analysis confirms that it is N-phenylisodecyl-9,10-epoxystearamide. Analysis shows oxirane-oxygen content 3.0% (theory 3.1%).

Following a similar procedure,

N-tetradecyl-N-phenyl-9,10-epoxystearamide,
N-tetradecyl-N-toluyl-9,10-epoxystearamide,
N-tetradecyl-N-phenyl-9,10,12,13-diepoxystearamide,
N-decyl-N-phenyl-9,10-epoxystearamide,
N-decyl-N-phenyl-9,10,12,13,15,16-triepoxystearamide,
N-tetradecyl-N-phenylamide of epoxidized tall oil fatty acids, and N-isodecyl-N-phenylamide of epoxidized soybean oil fatty acids are obtained, there being used tall oil and soybean oil as primary material.

EXAMPLE 5

N-(9,10-Epoxyoctadecyl)-N-Phenylbutyramide

N-oleyl-N-phenylbutyramide is prepared by condensing oleyl bromide and N-phenylbutyramide with sodium in boiling xylene according to the method described by H. Arnold in Arch. Pharm. 279, 181–186 (1941).

Epoxidation of N-oleyl-N-phenylbutyramide is carried out with a peracetic acid solution following the procedure described above. The product is N-(9,10-epoxyoctadecyl)-N-phenylbutyramide.

EXAMPLE 6

N-Pentadecylphenyl-γ-Valerolactam

A highly branched pentadecylbenzene is mono-nitrated to give substantially pure p-pentadecylnitrobenzene which is reduced with hydrogen over Raney nickel to p-pentadecylaniline. This aniline is heated with a 50% molar excess of γ-valerolactone at 300° C. for 16 hours and then distilled to give the N-pentadecylphenyl-γ-valerolactam which boils at 210° to 220° C. at 0.2 mm. The product has a $n_D^{25}$, 1.5147; nitrogen analysis 3.5% (theory 3.6%).

The N,N-di-substituted arylamides of the invention are useful primary materials for preparing further useful compounds. The present amides can be sulfonated to give surface active products. The amides having olefinic unsaturation undergo the reactions typical of olefins; they can be halogenated or hydrogenated. They can be oxidized to valuable glycols, to epoxides, or with chain scission to acids and aldehydes. The glycols in turn may be reacted to glycols, sulfates, boranes, and phosphites. The N-arylamides of the invention also find utility as additives to lubricants, as corrosion inhibitors, as thickeners, and as ingredients for pesticides. They are useful plasticizers for polyvinyl halide resins.

When used for this purpose, the N,N-di-substituted arylamides of the invention are ordinarily incorporated into vinyl halide polymers by mixing the powdered resin with the liquid plasticizer followed by mixing and/or kneading and then by curing the mix at an elevated temperature, for example, within the range from 150° to 200° C., on hot rolls or in a heated mixer, such as a Werner-Pfleiderer or Banbury mixer. The proportion of N,N-di-substituted arylamides that may be employed may vary over a great range since it is dependent on the particular amide of this invention which is selected, the specific polyvinyl halide resin to be plasticized, and the final degree of plasticization desired in the resin, this factor in itself being dependent on the ultimate application intended for the resin. With these facts in mind, one skilled in the art will use the arylamides in a "plasticizing amount," for most purposes this being from about 20 to 90 parts, and more specifically from 30 to 60 parts, of arylamide per 100 parts of resin. In amounts less than 20 parts per 100 parts of resin, the effect of selected N-arylamide may be noted; in amounts exceeding 100 parts of arylamide per 100 parts of polyvinyl chloride resin, the amides of the invention are more commonly suitable for use in organosols and plastisols.

In this connection, one skilled in the art will appreciate that the N,N-di-substituted arylamides of this invention which have a total carbon content exceeding that generally required for optimum compatibility with the resin at high plasticizer level may be employed as secondary plasticizer by reducing the proportion of plasticizer in the resin. The plasticizer should be present in a compatible amount while imparting to the resin the desired property, such limited amounts varying, for instance, from about 2% to 20%, or more. In this aspect, it is advisable to employ another compound as the primary plasticizer, the amide being the secondary plasticizer.

The amides of this invention are useful as plasticizers in vinyl halide polymers. This term refers to those polymers containing a predominant quantity, that is, a quantity greater than 50%, generally over 60%, of the monomer as vinyl halide units. This includes the homopolymers of the vinyl halides as well as the copolymers and interpolymers prepared therefrom. Other monomers that may be copolymerized with the vinyl halide include the vinyl type monomers such as, for example, those having a single $CH_2=C-$ group, such as vinylidene chloride, vinyl chloroacetate, chlorostyrene; chlorobutadienes, etc., and those copolymers of such vinyl compounds and other unsaturated materials copolymerizable therewith, for example, copolymers of a vinyl halide, such as vinyl chloride, with such materials as vinylidene chloride, vinyl esters of carboxylic acids, for example, vinyl acetate, vinyl propionate, vinyl butyrate, vinyl benzoate; esters of unsaturated acids, for example, alkyl acrylates, such as methyl acrylate, ethyl acrylate, propyl acrylate, butyl acrylate, allyl acrylate and the corresponding esters of methacrylic acid; vinyl aromatic compounds, for example, styrene; esters of α,β-unsaturated carboxylic acids, for example, the methyl, ethyl, butyl, amyl, hexyl, octyl esters of maleic, crotonic, itaconic, fumaric acids and the like. Further useful copolymers are those obtained by copolymerization of vinyl chloride with an ester of an α,β-unsaturated dicarboxylic acid, such as diethyl maleate, or other esters of maleic, fumaric, aconitic, itaconic acids, etc., in which 5 to 20 parts by weight of diethyl maleate or other analogous esters are used for every 95 to 80 parts by weight of vinyl chloride.

In accordance with the invention, there may be employed one or more N-arylamides of this invention in polyvinylhalide compositions; the N-arylamides of the invention may be employed as the sole plasticizer; or they may be employed in conjunction with conventional plasticizers, such as alkyl phthalates, alkyl phosphates, monomeric or polymeric epoxides, and others, such as those listed in United States Patent No. 2,795,565. Optionally, the resinous compositions may have incorporated therewith various stabilizers, fillers, dyes, pigments, and the like.

The value of the N,N-substituted arylamides of the invention is further demonstrated by the following illustrations.

A standard resinous composition is made up from the following ingredients.

TABLE I

*Standard Formulation*

|  | Parts |
|---|---|
| Polyvinyl chloride | 60 |
| Plasticizer | 40 |
| Barium cadmium laurate | 1.0 |

The plasticizers designated in Table II are incorporated into the vinyl halide polymers by the procedure further described above.

TABLE II

| Plasticizer: | Code No. |
|---|---|
| N-methyl-N-phenyl-3-octyltridecanoamide | 1 |
| N-methyl-N-phenylpalmitoleamide | 2 |
| N-pentadecylphenyl-γ-valerolactam | 3 |
| Di(2-ethylhexyl)phthalate | 4 |

The polyvinyl chloride resins are subjected to the following standard tests:

EVALUATION TESTS

*Test 1.*—Activated carbon volatility: 2″ squares of weighed specimens are placed between 2-inch layers of activated carbon in sealed glass jars which are maintained at 90° C. for 24 hours. The specimens are removed, dusted free of carbon and reweighed.

*Test 2.*—Torsional modulus at low temperatures: a 2¼ x ¼ sample is cut and mounted in a Tinius-Olsen stiffness tester, which measures the torsional modulus of plastic at various temperatures. The temperature at which a specimen has a torsional modulus of 135,000 lbs./sq. in., known as $T_f$ or $T_{135,000}$ is determined. This roughly corresponds to the "brittle point" obtained by cantilever apparatus.

*Test 3.*—Extraction by oil: Each weighed, conditioned 3 inches by 3 inches by 0.01 inch specimen is immersed in an 8-ounce jar (screw-capped) containing mineral oil and kept in the constant temperature room for 10 days (oil changed on fifth day). They are then removed and dried with clean cheesecloth. The specimens are conditioned, again wiped dry with clean cheesecloth, and reweighed. Percent plasticizer loss is calculated.

*Test 4.*—Compatibility: Weighed, conditioned duplicate samples, 4 inches by 4 inches by 0.010 inch are placed between two sheets of cardboard, which have been conditioned at least 15 hours. The specimens are in contact with the white, coated side of the cardboard. The cardboard-specimen sandwiches are placed between 5 inches by 5 inches by 1 inch wood blocks under a 3-kilogram weight. After seven days, the specimens are removed from the stack, conditioned, and reweighed. Percent plasticizer loss is calculated. The cardboard sheets are examined qualitatively for evidence of plasticizer stains.

The performance data of the polyvinyl chloride compositions are reported in Tables III, IV, and V. The amounts stated under volatility test, oil extraction test, and compatibility test are expressed as percentage loss by weight.

TABLE III

*Performance Data*

| Plasticizer | Activated carbon volatility | Low temperature flexibility (° C.) |
|---|---|---|
| 1 | 2.6 | −50 |
| 2 | 5.3 | −52.2 |
| 3 | 2.4 | |
| 4 | 9.0 | −33 |

The data illustrate the stability of the amides under high temperatures, there being significantly less loss than with an ordinary plasticizer. Also, the amides promote good suppleness and flexibility at low temperature. Accordingly, they are useful for applications where the resins are employed at low temperatures and as adjuvants to lower the low temperature flexibility of polyvinyl halide resins plasticized with conventional plasticizers.

The special value of typical epoxy-N,N-disubstituted arylamides of this invention is further demonstrated below:

TABLE IV

| Plasticizer | Code No. |
|---|---|
| N-Tetradecyl-N-phenyl-9,10,12,13-diepoxystearamide and N-tetradecyl-N-phenyl-9,10-diepoxystearamide in a 50/50 mole ratio | 1 |
| N-Isodecyl-N-phenyl-9,10-epoxystearamide | 2 |
| N-Ethyl-N-phenyl-9,10-epoxystearamide | 3 |
| Alkylepoxystearate | 4 |

The term "iso" refers to a highly branched alkyl substituent.

The performance is shown in Table V.

TABLE V

*Performance of Epoxyphenylamides*

| Plasticizer | Activated carbon volatility | Compatibility | Oil extraction, 10 days |
|---|---|---|---|
| 1 | 0.9 | 0.1 | 18.1 |
| 2 | 0.9 | 0.05 | 18.0 |
| 3 | 3.0 | 0.03 | 10.9 |
| 4 | 11.6 | 2.7 | 25.1 |

The epoxy phenylamides also exhibit low temperature flexibility below 30° C. In resistance to degradation to ultraviolet light test, they are stable over 1,000 hours, whereas di(2-ethylhexyl)phthalate failed in about 400 hours.

The above formulations are modified by replacing polyvinyl chloride by copolymers of (A) vinyl chloride, 87 parts, and vinyl acetate, 13 parts;
(B) vinyl chloride, 80 parts, and vinylidene chloride, 20 parts;
(C) vinyl chloride, 80 parts, and methyl acrylate, 20 parts;
(D) vinyl chloride, 95 parts, and vinyl isobutyl ether, 5 parts.

The resinous compositions are tested as described above. All compositions are supple and flexible, and they exhibit improved permanence over resinous compositions plasticized with di(2-ethylhexyl)phthalate.

Polyvinyl halide compositions in which the proportion of typical N,N-di-substituted arylamides is made to vary from 5 to 100 parts of amide for 100 parts of polyvinyl halide exhibit comparable properties. Of greatest practical interest are those in which the amide ranged from 20 to 60 parts for 100 parts of polyvinyl halide resin.

I claim:
1. An N,N-disubstituted arylamide which has the formula

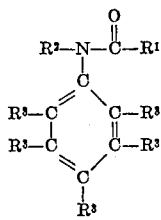

in which $R^1$ is an epoxidized residue of an olefinically unsaturated fatty acid having a carbon atom content of 12 to 22 carbon atoms,
  $R^2$ is an epoxidized residue of an olefinically unsaturated fatty acid having a carbon atom content of 12 to 22 carbon atoms,
  $R^3$ is selected from the group consisting of a hydrogen atom and an alkyl group,
  said N,N-disubstituted arylamide being further characterized by having a total carbon atom content of 24 to 72, and being liquid at about 25° C.

2. An N,N-disubstituted arylamide which has the formula

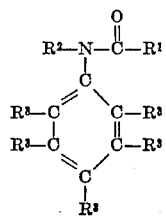

in which $R^1$ is an epoxidized residue of an olefinically unsaturated fatty acid having a carbon atom content of 12 to 22 carbon atoms,
  $R^2$ is an alkyl group having from 1 to 22 carbon atoms,
  $R^3$ is selected from the group consisting of a hydrogen atom and an alkyl group,
  said N,N-disubstituted arylamide being further characterized by having a total carbon atom content of 24 to 72, and being liquid at about 25° C.

3. An N,N-disubstituted arylamide which has the formula

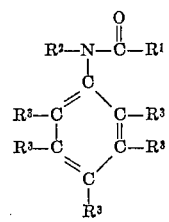

in which $R^1$ is an epoxidized residue of a vegetable oil,
  $R^2$ is an alkyl group having from 1 to 22 carbon atoms,
  $R^3$ is selected from the group consisting of a hydrogen atom and an alkyl group,
  said N,N-disubstituted arylamide being further characterized by having a total carbon atom content of 24 to 72, and being liquid at about 25° C.

4. N-decyl-N-phenyl-9,10-epoxystearamide.
5. N-decyl-N-phenyl-9,10,12,13-diepoxystearamide.
6. N-tetradecyl-N-phenylamide of epoxidized tall oil fatty acids.
7. N-isodecyl-N-phenylamide of epoxidized soybean oil fatty acids.
8. N-isohexyl-N-phenyl-9,10-epoxystearamide.

References Cited in the file of this patent
UNITED STATES PATENTS

| | | |
|---|---|---|
| 2,567,237 | Scanlan et al. | Sept. 11, 1951 |
| 2,687,389 | Dazzi | Aug. 24, 1954 |
| 2,730,531 | Payne et al. | Jan. 10, 1956 |
| 2,850,509 | Nichols | Sept. 2, 1958 |
| 2,851,494 | Ehrhart et al. | Sept. 9, 1958 |
| 2,866,801 | Himel et al. | Dec. 30, 1958 |
| 2,891,030 | Coler | June 16, 1959 |
| 2,891,912 | Schwartz | June 23, 1959 |
| 2,898,353 | Schulze | Aug. 4, 1959 |

FOREIGN PATENTS

| | | |
|---|---|---|
| 583,243 | Germany | Aug. 31, 1933 |
| 862,888 | Germany | Jan. 15, 1953 |

OTHER REFERENCES

Nigam et al.: J. Chem. Soc., London, pages 3320–3321, July 1957.
Magne et al.: Industrial and Engineering Chemistry, vol. 50, No. 4, April 1958, pp. 617–618.